US007755809B2

(12) United States Patent
Fujita et al.

(10) Patent No.: US 7,755,809 B2
(45) Date of Patent: Jul. 13, 2010

(54) LASER SCANNING OPTICAL SYSTEM AND IMAGE FORMING APPARATUS

(75) Inventors: Hirokazu Fujita, Nara (JP); Kenzo Ohkubo, Yamato-Takada (JP); Takasumi Wada, Nara (JP); Yasuhiro Ono, Kyoto (JP); Takayuki Ohno, Yamato-Koriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 898 days.

(21) Appl. No.: 11/563,220

(22) Filed: Nov. 27, 2006

(65) Prior Publication Data
US 2007/0146848 A1 Jun. 28, 2007

(30) Foreign Application Priority Data
Dec. 26, 2005 (JP) ............................. 2005-372887

(51) Int. Cl.
  *H04N 1/04* (2006.01)
(52) U.S. Cl. .................. 358/474; 358/484; 358/510; 358/494; 399/301; 359/204.1; 359/212.1; 347/152; 347/233; 347/232; 235/462.27; 425/174.4
(58) Field of Classification Search ............. 358/474, 358/501, 484, 1.9, 494, 481; 359/204.1, 359/212.2, 216.1, 196.1; 347/152, 249, 233, 347/232, 235, 250, 241; 399/301, 328; 425/174.4; 235/462.27
See application file for complete search history.

(56) References Cited

U.S. PATENT DOCUMENTS

| 5,014,675 | A | * | 5/1991 | Koiwa | 123/609 |
| 5,300,956 | A | * | 4/1994 | Ohta et al. | 347/233 |
| 5,610,647 | A | * | 3/1997 | Takada | 347/137 |
| 5,754,214 | A | * | 5/1998 | Okino | 347/229 |
| 5,883,385 | A | * | 3/1999 | Takahashi et al. | 250/235 |
| 6,317,244 | B1 | * | 11/2001 | Ishibe | 359/204.1 |
| 6,326,992 | B1 | * | 12/2001 | Inoue et al. | 347/241 |
| 6,873,445 | B2 | * | 3/2005 | Shiraishi | 359/204.1 |
| 7,295,359 | B2 | * | 11/2007 | Fujita et al. | 359/204.1 |
| 2001/0022343 | A1 | | 9/2001 | Sakai et al. | |
| 2002/0021351 | A1 | * | 2/2002 | Shinohara et al. | 347/235 |
| 2003/0156184 | A1 | * | 8/2003 | Suzuki et al. | 347/249 |
| 2004/0057092 | A1 | | 3/2004 | Abe | |

(Continued)

FOREIGN PATENT DOCUMENTS

JP          2001-311895          11/2001

(Continued)

*Primary Examiner*—Negussie Worku
(74) *Attorney, Agent, or Firm*—Renner, Otto, Boisselle & Sklar, LLP

(57) ABSTRACT

A laser scanning optical system converts a plurality of beams emitted from the laser diode (LD) into parallel light using a collimator lens, shapes the parallel light using an aperture, and executes exposure of a plurality of lines simultaneously on a photoreceptor drum. To cause a necessary emitting point interval d determined uniquely from the magnification of the optical system to coincide with an emitting point interval of the LD used, the LD is rotated by an angle θ against the main optical axis plane thereof. In this case, a converting device that converts the aspect ratio of a profile of the light beam emitted from the LD is provided. A conversion characteristic of the converting device is adjusted such that the characteristic is matched with a condition within a predetermined region following a characteristic of the optical system.

16 Claims, 9 Drawing Sheets

U.S. PATENT DOCUMENTS

2004/0057096 A1* 3/2004 Amada et al. ............... 359/204
2004/0090520 A1 5/2004 Sakai et al.

FOREIGN PATENT DOCUMENTS

| JP | 2002-090675 | 3/2002 |
| JP | 2003-069152 | 3/2003 |
| JP | 2004-006641 | 1/2004 |
| JP | 2004-070090 | 3/2004 |
| JP | 2004-109699 | 4/2004 |
| JP | 2004-109700 | 4/2004 |
| JP | 2004-117680 | 4/2004 |
| JP | 2004-233638 | 8/2004 |
| JP | 2005-049535 | 2/2005 |

* cited by examiner

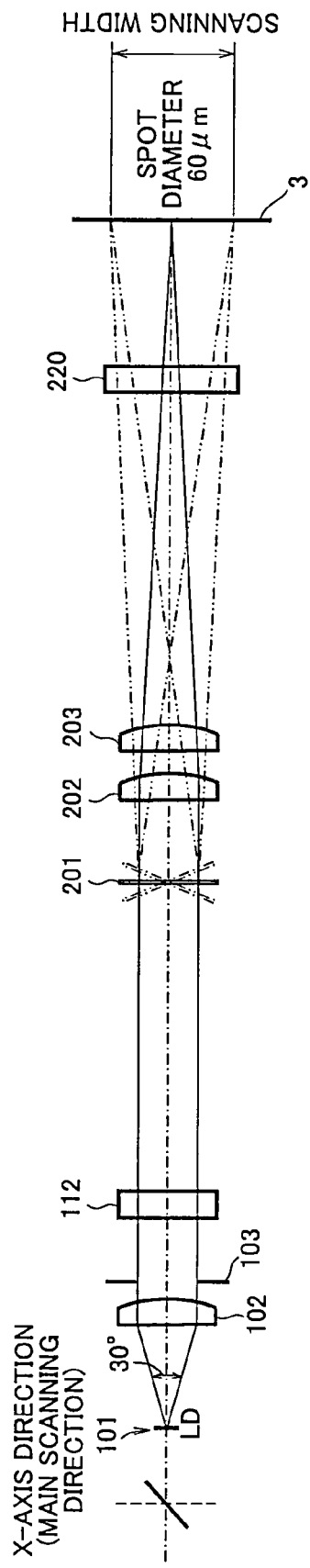
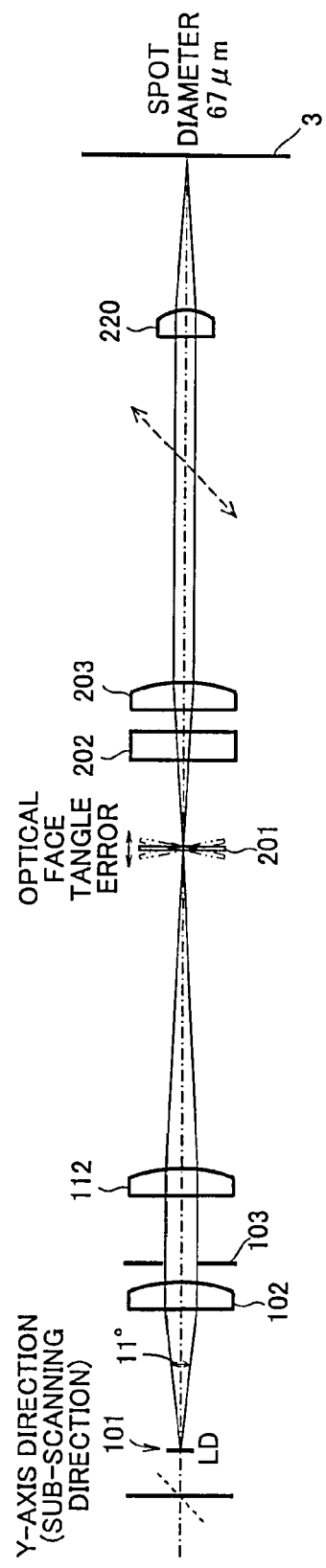
FIG.2A
FIG.2B

FIG.7

| | | 1 | 2 | 3 | 4 | 5 | 6 | 7 | 8 | 9 | 10 | 11 | 12 | 13 |
|---|---|---|---|---|---|---|---|---|---|---|---|---|---|---|
| COLLIMATOR | mm | 14.5 | 14.51 | 14.52 | 14.53 | 14.54 | 14.55 | 14.56 | 14.57 | 14.58 | 14.59 | 14.6 | 14.61 | 14.62 |
| BACK FOCUS | mm | 76.9 | 76.9 | 76.9 | 76.9 | 76.9 | 76.9 | 76.9 | 76.9 | 76.9 | 76.9 | 76.9 | 76.9 | 76.9 |
| EMITTING POINT PITCH | um | 14 | 14 | 14 | 14 | 14 | 14 | 14 | 14 | 14 | 14 | 14 | 14 | 14 |
| DIVERGENCE ANGLE $\alpha \parallel$ | | 11.8 | 11.8 | 11.8 | 11.8 | 11.8 | 11.8 | 11.8 | 11.8 | 11.8 | 11.8 | 11.8 | 11.8 | 11.8 |
| DIVERGENCE ANGLE $\alpha \perp$ | deg | 35.3 | 35.3 | 35.3 | 35.3 | 35.3 | 35.3 | 35.3 | 35.3 | 35.3 | 35.3 | 35.3 | 35.3 | 35.3 |
| CONVERSION COEFFICIENT $\Delta \parallel$ | deg | 1 | 1 | 1 | 1 | 1 | 1 | 1 | 1 | 1 | 1 | 1 | 1 | 1 |
| CONVERSION COEFFICIENT $\Delta \perp$ | | 1 | 1 | 1 | 1 | 1 | 1 | 1 | 1 | 1 | 1 | 1 | 1 | 1 |
| EXPOSURE PITCH | um | 42.3 | 42.3 | 42.3 | 42.3 | 42.3 | 42.3 | 42.3 | 42.3 | 42.3 | 42.3 | 42.3 | 42.3 | 42.3 |
| ANGLE | deg | 55.2 | 55.2 | 55.2 | 55.1 | 55.1 | 55.1 | 55.1 | 55 | 55 | 55 | 54.9 | 54.9 | 54.9 |
| BEAM WIDTH m $\parallel$ | mm | 2.99 | 2.99 | 2.99 | 3 | 3 | 3 | 3 | 3 | 3.01 | 3.01 | 3.01 | 3.01 | 3.01 |
| BEAM WIDTH m $\perp$ | mm | 9.23 | 9.24 | 9.25 | 9.25 | 9.26 | 9.27 | 9.27 | 9.28 | 9.28 | 9.29 | 9.3 | 9.3 | 9.31 |
| ROTATION WIDTH M $\parallel$ | mm | 3.55 | 3.56 | 3.56 | 3.56 | 3.57 | 3.57 | 3.57 | 3.58 | 3.58 | 3.58 | 3.59 | 3.59 | 3.59 |
| ROTATION WIDTH M $\perp$ | mm | 4.75 | 4.75 | 4.75 | 4.75 | 4.75 | 4.76 | 4.76 | 4.76 | 4.76 | 4.76 | 4.76 | 4.76 | 4.76 |
| APERTURE WIDTH Am | mm | 3.59 | 3.59 | 3.59 | 3.59 | 3.59 | 3.59 | 3.59 | 3.59 | 3.59 | 3.59 | 3.59 | 3.59 | 3.59 |
| APERTURE WIDTH As | mm | 1.21 | 1.21 | 1.21 | 1.21 | 1.21 | 1.21 | 1.21 | 1.21 | 1.21 | 1.21 | 1.21 | 1.21 | 1.21 |
| EVALUATION RESULT | | | | | | | | | | | | | A | A |

| 14.63 | 14.64 | 14.65 | 14.66 | 14.67 | 14.68 | 14.69 | 14.7 | 14.71 | 14.72 | 14.73 | 14.74 | 14.75 | 14.76 | 14.77 | 14.78 | 14.79 | 14.8 |
|---|---|---|---|---|---|---|---|---|---|---|---|---|---|---|---|---|---|
| 76.9 | 76.9 | 76.9 | 76.9 | 76.9 | 76.9 | 76.9 | 76.9 | 76.9 | 76.9 | 76.9 | 76.9 | 76.9 | 76.9 | 76.9 | 76.9 | 76.9 | 76.9 |
| 14 | 14 | 14 | 14 | 14 | 14 | 14 | 14 | 14 | 14 | 14 | 14 | 14 | 14 | 14 | 14 | 14 | 14 |
| 11.8 | 11.8 | 11.8 | 11.8 | 11.8 | 11.8 | 11.8 | 11.8 | 11.8 | 11.8 | 11.8 | 11.8 | 11.8 | 11.8 | 11.8 | 11.8 | 11.8 | 11.8 |
| 35.3 | 35.3 | 35.3 | 35.3 | 35.3 | 35.3 | 35.3 | 35.3 | 35.3 | 35.3 | 35.3 | 35.3 | 35.3 | 35.3 | 35.3 | 35.3 | 35.3 | 35.3 |
| 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 |
| 42.3 | 42.3 | 42.3 | 42.3 | 42.3 | 42.3 | 42.3 | 42.3 | 42.3 | 42.3 | 42.3 | 42.3 | 42.3 | 42.3 | 42.3 | 42.3 | 42.3 | 42.3 |
| 54.9 | 54.8 | 54.8 | 54.8 | 54.8 | 54.7 | 54.7 | 54.7 | 54.6 | 54.6 | 54.6 | 54.5 | 54.5 | 54.5 | 54.4 | 54.4 | 54.4 | 54.4 |
| 3.02 | 3.02 | 3.02 | 3.02 | 3.03 | 3.03 | 3.03 | 3.03 | 3.03 | 3.04 | 3.04 | 3.04 | 3.04 | 3.04 | 3.05 | 3.05 | 3.05 | 3.05 |
| 9.32 | 9.32 | 9.33 | 9.34 | 9.34 | 9.35 | 9.35 | 9.36 | 9.37 | 9.37 | 9.38 | 9.39 | 9.39 | 9.4 | 9.41 | 9.41 | 9.42 | 9.42 |
| 3.6 | 3.6 | 3.6 | 3.61 | 3.61 | 3.61 | 3.62 | 3.62 | 3.63 | 3.63 | 3.63 | 3.64 | 3.64 | 3.64 | 3.65 | 3.65 | 3.65 | 3.66 |
| 4.76 | 4.76 | 4.76 | 4.76 | 4.77 | 4.77 | 4.77 | 4.77 | 4.77 | 4.77 | 4.77 | 4.77 | 4.77 | 4.77 | 4.77 | 4.77 | 4.78 | 4.78 |
| 3.59 | 3.59 | 3.59 | 3.59 | 3.59 | 3.59 | 3.59 | 3.59 | 3.59 | 3.59 | 3.59 | 3.59 | 3.59 | 3.59 | 3.59 | 3.59 | 3.59 | 3.59 |
| 1.21 | 1.21 | 1.21 | 1.21 | 1.21 | 1.21 | 1.21 | 1.21 | 1.21 | 1.21 | 1.21 | 1.21 | 1.21 | 1.21 | 1.21 | 1.21 | 1.21 | 1.21 |
| A | A | A | A | A | A | A | A | A | A | A | A | A | A | A | A | A | A |

FIG.8

| COLLIMATOR | | | | | | | | | | | | | | | | |
|---|---|---|---|---|---|---|---|---|---|---|---|---|---|---|---|---|
| CONVERSION COEFFICIENT Δ∥ | 4 | 3.8 | 3.6 | 3.4 | 3.2 | 3 | 2.8 | 2.6 | 2.4 | 2.2 | 2 | 1.8 | 1.6 | 1.4 | 1.2 | 1 |
| 1 | 4.13 | 4.37 | 4.64 | 4.93 | 5.27 | 5.64 | 6.07 | 6.56 | 7.12 | 7.77 | 8.55 | 9.46 | 10.56 | 11.84 | 13.28 | 14.61 |
| 1.2 | 4.12 | 4.37 | 4.63 | 4.93 | 5.26 | 5.64 | 6.06 | 6.55 | 7.11 | 7.76 | 8.53 | 9.44 | 10.53 | 11.8 | 13.21 | |
| 1.4 | 4.12 | 4.37 | 4.63 | 4.93 | 5.26 | 5.63 | 6.06 | 6.5 | 7.1 | 7.8 | 8.5 | 9.4 | 11 | 12 | | |
| 1.6 | 4.1 | 4.4 | 4.63 | 4.93 | 5.26 | 5.63 | 6.06 | 6.5 | 7.1 | 7.8 | 8.5 | 9.4 | 10 | | | |
| 1.8 | 4.1 | 4.4 | 4.63 | 4.93 | 5.26 | 5.63 | 6.06 | 6.5 | 7.1 | 7.8 | 8.5 | 9.4 | | | | |
| 2 | 4.1 | 4.4 | 4.63 | 4.9 | 5.26 | 5.63 | 6.06 | 6.5 | 7.1 | 7.7 | 8.5 | | | | | |

CONVERSION COEFFICIENT Δ⊥

LASER SCANNING OPTICAL SYSTEM AND IMAGE FORMING APPARATUS

This Non-provisional application claims priority under 35 U.S.C. §119 (a) on Patent Application No. 2005-372887 filed in JAPAN on Dec. 26, 2005, the entire contents of which are hereby incorporated herein by reference.

FIELD OF THE INVENTION

The present invention relates generally to a laser scanning optical system and an image forming apparatus using the optical system, and more particularly, to a laser scanning optical system that is applicable to an optical scanning unit used in an electro-photographic image forming apparatus such as, for example, a digital multi-function peripheral, a printer, and a facsimile machine.

BACKGROUND OF THE INVENTION

Image forming apparatuses such as a digital copy machine, a laser printer, and a facsimile machine are prevailing. An optical scanning unit having a laser scanning optical system that scans a laser beam is used for the above image forming apparatus. When an image is formed in the image forming apparatus, after a photoreceptor drum that is an image carrier is charged by a charging unit, writing according to image information is executed by the optical scanning unit and an electrostatic latent image is formed on the photoreceptor drum. The electrostatic latent image on the photoreceptor drum is visualized by toner supplied from a development unit. The toner image visualized on the photoreceptor is transferred onto a recording paper sheet by a transfer unit and is fixed on the recording paper sheet by a fixing unit. Thereby, a desired image is obtained.

To an image forming apparatus using the above optical scanning unit, higher speed operations and larger capacity information processing are demanded. To realize such a demand, for example, it can be contemplated to employ a configuration to increase the rotation speed of a polygon mirror and a pixel clock frequency.

An optical scanning unit is practically used that is adapted to be able to expose simultaneously a plurality of scanning lines by applying and scanning a plurality of laser beams (a multi-beam) simultaneously to/on a photoreceptor drum to improve the image forming speed. The writing speed can be increased by writing simultaneously a plurality of scanning lines using the multi-beam.

At present, the rotation speed of the polygon mirror and the pixel clock frequency as above are usually set respectively to values that are each close to the limit value thereof and increasing the rotation speed and the pixel clock frequency any more is practically difficult.

In contrast, the above scheme of applying simultaneously the plurality of laser beams to the photoreceptor drum using the multi-beam is highly reliable because image forming can be executed at a high speed even with high resolution and, therefore, this scheme is employed especially in an image forming apparatus of high-speed specifications.

In an optical system to expose simultaneously a plurality of scanning lines using a plurality of laser beams, a multiple-emission laser diode (LD) having a plurality of emitting points is used as a laser light source thereof. For example, Japanese Laid-Open Patent Publication No. 2003-69152 discloses an example of a multi-beam LD device. The Japanese Laid-Open Patent Publication No. 2003-69152 discloses a configuration including four active regions aligned at pitches of at least 16 μm that are at a predetermined height on a sapphire substrate and are parallel to the sapphire substrate.

The line pitch in a sub-scanning direction on the photoreceptor needs to be matched with an integral multiple of the resolution in the sub-scanning direction. When the above multiple-emission LD is used, the line pitch in the sub-scanning direction on the photoreceptor is determined uniquely by the disposition pitch of the emission points of the LD and the magnification in the sub-scanning direction from the LD to the photoreceptor.

However, the magnification in the sub-scanning direction from the LD to the photoreceptor is determined depending on an optical system that the optical scanning unit has and the disposition pitch of the emission points of the LD is determined by the semiconductor process thereof. That is, when the line pitch in the sub-scanning direction on the photoreceptor is tried to be matched with an integral multiple of the resolution in the sub-scanning direction as above, a fully satisfactory configuration can not always be obtained due to restrictions concerning specifications and configurations of devices and members used in the optical system or restrictions concerning specifications, etc., of an available LD.

For the demand to match the line pitch in the sub-scanning direction on the photoreceptor with an integral multiple of the resolution in the sub-scanning direction, a scheme is known according to which a multi-emission LD is rotated against the main scanning plane (that is, the main optical axis plain) and the direction of the disposition of emitting points of the LD is set to be slanted against the main scanning plane and, thereby, the line pitch in the sub-scanning direction on the photoreceptor is adjusted to be a desired value.

For example, when image forming is executed with 600 dpi that is an ordinary pixel density (resolution), the scanning line interval (the line pitch in the sub-scanning direction) D is 42.3 μm. In this case, when, for example, the LD device described in the above Japanese Laid-Open Patent Publication No. 2003-69152 is used, the emitting point interval is at least 16 μm. Therefore, to match the scanning line interval using this LD, it is necessary to set the sub-scanning line magnification of the scanning optical system to an integral multiple of 42.3/16 and, therefore, a problem has arisen that the above is a significant restriction on the optical design.

In this case, the LD device is rotated by an angle θ against the main optical axis plane (the main scanning plane) of the LD device and, thereby, an apparent emitting point pitch in the sub-scanning direction is equalized with the above necessary emitting point interval d.

An LD applied to a scanning optical system of an optical scanning unit can be generally an edge emitting LD in the viewpoint of the cost and the output power. The emission profile of an edge emitting LD is elliptic due to its structure. FIG. 10 diagrammatically depicts the emission profile of a laser beam 122 emitted from an edge emitting laser diode (LD) 101 having one emitting portion 121. The edge emitting LD 101 emits the laser beam 122 having the emission profile that is laterally elongated against the emitting portion 121 that is longitudinally elongated due to astigmatism thereof. An example of the divergence angle of the laser from the LD 101 is 30° in the long axis direction and 11° in the short axis direction of the elliptic profile.

The above phenomenon similarly occurs to the above multi-emitting point LD and profiles of the plurality of emitted light beams are respectively elliptic profiles. FIG. 11 diagrammatically depicts emission profiles of the laser beams 122 emitted from the edge emitting laser diode (LD) 101 having two emitting portions 121.

When the above multi-emission LD 101 is used and the LD 101 is rotated against the optical axis thereof to match the line pitch on the photoreceptor to a desired value, the emission profiles thereof also are rotated simultaneously as shown in FIG. 11.

In a laser scanning optical system utilizing a single-emitting point LD having one emitting portion, usually, a laser beam emitted by the LD is converted by a collimator lens into substantially parallel light and, thereafter, the beam is shaped by an aperture such that the shape of the beam is elongated in the main scanning direction.

The aperture is provided to determine the beam diameter in the main scanning direction on a photoreceptor by defining the width of the beam in the main scanning direction. In an aperture portion, when the width in the main scanning direction of the light beam is reduced, the beam diameter in the main scanning direction on the photoreceptor is enlarged.

At this time, to reduce eclipse by the aperture, the LD is disposed such that the long axis of the elliptic profile of the LD is substantially in the main scanning direction. FIG. 12 diagrammatically depicts the relation between the aperture and the emission profile in this case. In FIG. 12, "103" denotes the aperture and "122" denotes the laser beam having the elliptic emission profile.

For the multi-emitting point LD, as above, the rotation direction of the LD is determined to match the line pitch in the sub-scanning direction on the photoreceptor to a desired value.

When the LD is rotated, the long axis direction of the aperture and the long axis direction of the emission profile do not coincide with each other. In this case, the beam width may be smaller than the aperture width depending on the focal length f of the collimator lens.

FIG. 13 diagrammatically depicts the relation between the one laser beam 122 and the aperture 103.

In the above case, by increasing the focal length f of the collimator lens, the beam width in the main scanning direction at the position of the aperture can be increased to a length larger than the aperture width in the longitudinal direction. However, in this case, the beam width in the sub-scanning direction is increased together with that in the main scanning direction and, therefore, the eclipse by the aperture is also increased and the beam power passing through the aperture is decreased. That is, the utilization efficiency of the emitted laser beam is degraded and the transmission efficiency of the emitted energy is degraded.

Thereby, an LD with large power is necessary to secure the applied power on the photoreceptor and many problems have arisen such as increase of power consumption, occurrence of adverse effects due to heat dissipation, and delay of switching time specific to a high output power LD.

Because the power of the beam exiting from the aperture varies according to the rotation angle of the LD, a problem has arisen that the power is varied with the rotation of the LD when, for example, the rotation angle of the LD is corrected to correct the magnification that is varied by temperature variation.

SUMMARY OF THE INVENTION

The object of the present invention is to provide a laser scanning optical system having a high efficiency and high reliability laser scanning characteristic and an image forming apparatus having the optical system by improving the energy transmission efficiency from a laser diode (LD) to a photoreceptor and by enabling to suppress power variation caused by the rotation of the LD.

Another object of the present invention is to provide a laser scanning optical system having a semiconductor laser, a collimator lens that converts a plurality of light beams emitted from the semiconductor laser into parallel light, and an aperture that defines a diameter of a spot of the light beam on an image carrier, and the system scanning the light beams emitted from the collimator lens and exposing simultaneously a plurality of lines on the image carrier, wherein the laser scanning optical system has a converting device that converts an aspect ratio of a profile of the light beam exited from the semiconductor laser, wherein the converting device converts the plurality of light beams, and wherein, when it is assumed that a main scanning direction is a beam scanning direction in the laser scanning optical system and a sub-scanning direction is a direction perpendicular to the main scanning direction, $$Am < \sqrt{\frac{1}{\left(\frac{\cos^2\theta'}{m_\perp^2} + \frac{\sin^2\theta'}{m_\|^2}\right)}} \quad \text{[Equation 1]}$$

$$As < \sqrt{\frac{1}{\left(\frac{\sin^2\theta'}{m_\perp^2} + \frac{\cos^2\theta'}{m_\|^2}\right)}} \quad \text{[Equation 2]}$$

$$L = \Delta_\| \times \beta \times \frac{fB}{fA} \times \cos\theta' \quad \text{[Equation 3]}$$

$$m_\perp = 2 \times fA \times \tan(\Delta_\perp \frac{\alpha_\perp}{2}), \text{ and} \quad \text{[Equation 4]}$$

$$m_\| = 2 \times fA \times \tan(\Delta_\| \frac{\alpha_\|}{2}) \quad \text{[Equation 5]}$$

hold, where

Am is a width of the aperture in the main scanning direction;

As is a width of the aperture in the sub-scanning direction;

$m_\perp$ is a diameter of an elliptic light beam in a long axis direction;

$m_\|$ is a diameter of the elliptic light beam in a short axis direction;

fA is a focal length of the collimator lens;

fB is a focal length of a back focus lens;

$\alpha_\perp$ is a divergence angle in a direction perpendicular to lining of semiconductor laser emitting points;

$\alpha_\|$ is a divergence angle in a direction parallel to the lining of the semiconductor laser emitting points;

β is a disposition interval of the semiconductor laser emitting points;

θ' is a rotation angle formed by the lining direction of the semiconductor laser emitting points and a main scanning plane;

$\Delta_\perp$ is a conversion coefficient of the converting device corresponding to the direction perpendicular to the lining of the semiconductor laser emitting points;

$\Delta_\|$ is a conversion coefficient of the converting device corresponding to the direction parallel to the lining of the semiconductor laser emitting points; and L is a line pitch of an exposing light beam in the sub-scanning direction.

Another object of the present invention is to provide the laser scanning optical system, wherein the collimator lens functions as the converting device by having an anamorphic shape, converts the aspect ratio of the profile of the light beam emitted from the semiconductor laser, and converts the light beam-into parallel light.

Another object of the present invention is to provide the laser scanning optical system, wherein the collimator lens is adjusted to be at an inclination angle equal to an inclination angle θ of the semiconductor laser to adjust the pitch in the sub-scanning direction on the image carrier.

Another object of the present invention is to provide the laser scanning optical system, wherein the converting device is provided on an optical path between the collimator lens and the semiconductor laser.

Another object of the present invention is to provide the laser scanning optical system, wherein the converting device is provided on an optical path between the collimator lens and the aperture.

Another object of the present invention is to provide the laser scanning optical system, wherein the converting device is adjusted to be at an inclination angle equal to an inclination angle of the semiconductor laser to adjust the pitch in the sub-scanning direction on the image carrier.

Another object of the present invention is to provide the laser scanning optical system, wherein the plurality of light beams are emitted light beams by one semiconductor laser having a plurality of emitting points or by a plurality of semiconductor lasers each having one emitting point.

Another object of the present invention is to provide an image forming apparatus comprising the above laser scanning optical system and a photoreceptor, wherein the laser scanning optical system forms a latent image on the photoreceptor, the latent image is visualized, and, thereby, image forming is executed.

BRIEF DESCRIPTION OF THE DRAWINGS

FIGS. 2A and 2B are explanatory views of states of a light beam of each color in a primary optical system and a secondary optical system;

FIG. 7 depicts an example of the simulation result in an optical system that converts a light beam emitted from a multi-emission LD into parallel light using a collimator lens and shapes the parallel light using an aperture;

FIG. 8 depicts a table that lists the calculation result of a focal length of a collimator lens necessary in the optical system for which simulation of FIG. 7 is executed;

PREFERRED EMBODIMENTS OF THE INVENTION

Description will be given for a configuration example of an image forming apparatus applicable with a laser scanning optical system of the present invention.

Figure 1:
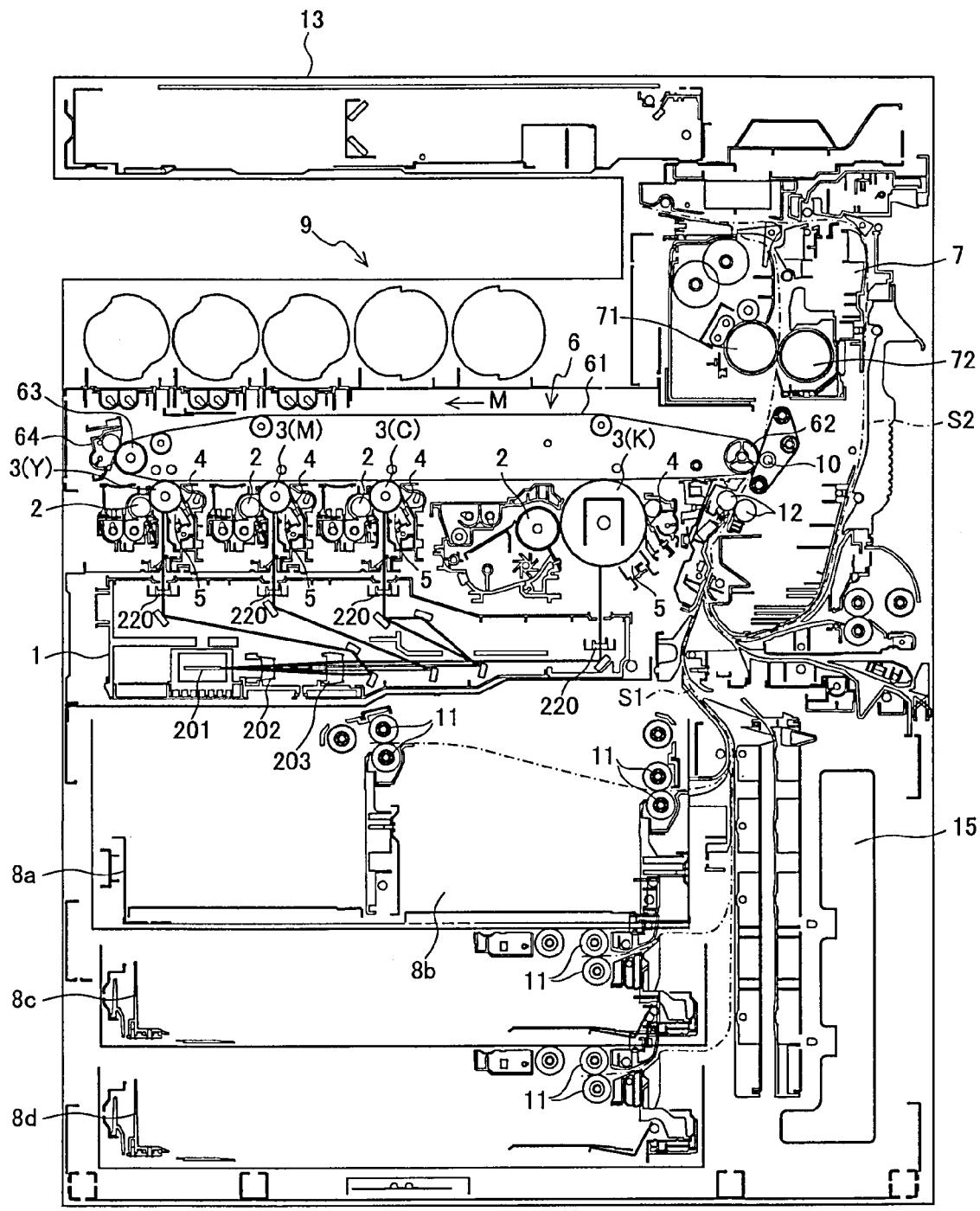
FIG. 1 depicts an embodiment of an image forming apparatus of the present invention.

FIG. 1 depicts an embodiment of an image forming apparatus of the present invention. The image forming apparatus forms multicolor images and monochrome images on predetermined sheets (recording paper sheets) according to image data transmitted externally. As shown, the apparatus is configured by having an exposure unit 1, development units 2, photoreceptor drums 3 (3 (K), 3 (C), 3 (M), and 3 (Y)), cleaner units 4, charging units 5, an intermediate transfer belt unit 6, a fixing unit 7, paper feeding cassettes 8, a paper ejection tray 9, an original document reading device (scanner unit) 13, etc. The image forming apparatus can form an image on a medium such as a sheet from original document image information read by a scanner of the original document reading device 13, and can also form an image from image information inputted from an external device, etc., that is connected to the image forming apparatus.

Image data handled by the image forming apparatus corresponds to a color image that uses colors of black (K), cyan (C), magenta (M), and yellow (Y). Therefore, for the development unit 2, the photoreceptor drum (image carrier) 3, the charging unit 5, and the cleaner unit 4, four sets for each of the above components are provided such that four types of latent images respectively corresponding to the colors and the four sets are respectively set for black, cyan, magenta, and yellow and, by these components, four image stations are configured.

In the embodiment, the photoreceptor drum 3 (K) corresponding to black of the photoreceptor drums 3 corresponding to the above black, cyan, magenta, and yellow is configured such that the drum 3 (K) has a larger diameter (for example, a diameter twice as large) compared to those of other photoreceptor drums 3 (3 (C), 3 (M), and 3 (Y)). By increasing the diameter only of the photoreceptor drum 3 (K) for black, monochrome image forming that is used at a high frequency can be executed at a higher speed. The replacement cycles of respective photoreceptor drums of which use frequencies are different from each other can be equalized and, therefore, the photoreceptor drums for respective colors can be rationally used.

In the embodiment, description will be given for an example of forming a latent image scanning one light beam on each of the above photoreceptor drums 3 each corresponding to black, cyan, magenta, or yellow. Instead, for example, a configuration may be employed according to which two-beam scheme (the main scanning of two lines is simultaneously executed using two light beams) is applied only to an exposing light beam to the photoreceptor drum 3 (K) for black and, thereby, improvement of the speed for black is facilitated.

In the case where only the diameter of the photoreceptor drum 3 (K) for black is increased as above, to execute precisely "phase control" when all the photoreceptor drums for respective colors are used in forming a color image, it is preferable that the diameter of the photoreceptor for black is an integral multiple of the diameter of the photoreceptor drums 3 (C), 3 (M), and 3 (Y) for other colors (yellow, magenta, and cyan).

In the embodiment, each angle formed by the optical axis of a light beam that scans each photoreceptor drum 3 and a tangential line of the surface of the photoreceptor drum 3 at the intersection of the surface of the photoreceptor drum 3 and the optical axis of the light beam is set to be equal to each other among those of the plurality of photoreceptor drums 3.

The charging unit 5 is a charging means for electrostatically charging the surface of the photoreceptor drum 3 uniformly to a predetermined electric potential and, in addition to the contact type such as roller type or brush type as shown in FIG. 1, a charger type charging unit may be used.

The exposure unit 1 corresponds to the optical scanning unit having the laser scanning optical system relating to the present invention and is configured to be a laser scanning unit (LSU) equipped with a laser irradiating portion and a reflecting mirror as shown in FIG. 1. The exposure unit 1 is provided with a polygon mirror 201 that scans laser beams, and optical elements such as lenses and mirrors for guiding the light beams reflected by the polygon mirror 201 to the photoreceptor drums 3. The configuration of the optical scanning unit constituting the exposure unit 1 will be described in detail later. In some techniques, for example, the exposure unit 1 may use an EL or LED writing head in which light emitting elements are arranged in an array.

The exposure unit 1 has a function for exposing the charged photoreceptor drums 3 according to the input image data to form electrostatic latent images corresponding to the image data on the surfaces of the photoreceptor drums 3. The development unit 2 develops the electrostatic latent image formed on each photoreceptor drum 3 with toner of each of four colors (Y, M, C, and K). The cleaner unit 4 removes and collects the toner remaining on the surface of the photoreceptor drum 3 after the development and the image transfer.

The intermediate transfer belt unit 6 is disposed above the photoreceptor drums 3 and includes an intermediate transfer belt 61, an intermediate transfer belt driving roller 62, an intermediate transfer belt driven roller 63, an intermediate transfer belt cleaning unit 64, etc.

The intermediate transfer belt 61 is laid with tension and is rotationally driven in the direction indicated by an arrow M by the intermediate transfer belt driving roller 62 and the intermediate transfer belt driven roller 63.

The intermediate transfer belt 61 is provided so as to contact with each photoreceptor drum 3. The intermediate transfer belt 61 has a function for forming a color toner image (multicolor toner image) on the intermediate transfer belt 61 by transferring the toner image of each color formed on the photoreceptor drum 3 sequentially onto the intermediate transfer belt 61 in an overlapping manner. The intermediate transfer belt 61 is formed using a film with a thickness of about 100 μm to 150 μm so as to have no end. A toner box for each color is provided above the intermediate transfer belt 61 to supply the toner to the photoreceptor drum 3.

The transfer of the toner image from the photoreceptor drum 3 to the intermediate transfer belt 61 is performed by an intermediate transfer roller not shown in contact with the back side of the intermediate transfer belt 61. To the intermediate transfer roller, a high-voltage transfer bias (high voltage with the opposite polarity (+) to the charging polarity (−) of the toner) is applied for transferring the toner image. The intermediate transfer roller is, for example, a roller having a base of a metal (e.g., stainless steel) shaft with a diameter of 8 to 10 mm and the surface covered with a conductive elastic material (e.g., EPDM, urethane foam, etc.). With the conductive elastic material, the high voltage can be applied uniformly to the intermediate transfer belt 61. Although the roller shape is used for the transfer electrode in this embodiment, a brush may be used.

The electrostatic image is developed on each photoreceptor drum 3 according to each color as described above and is laminated on the intermediate transfer belt 61. With the rotation of the intermediate transfer belt 61, the laminated image information is transferred onto a paper sheet by a transfer roller 10 (described later) disposed at a contact position between the paper sheet and the intermediate transfer belt 61.

The intermediate transfer belt 61 and the transfer roller 10 are pressed against each other with a predetermined nip and a voltage (high voltage with the opposite polarity (+) to the charging polarity (−) of the toner) is applied to the transfer roller 10 to transfer the toner to the paper sheet. To obtain the nip constantly with the transfer roller 10, one of the transfer roller 10 and the intermediate transfer belt driving roller 62 is made of a hard material (e.g., metal) and the other utilizes a soft material roller such as an elastic roller (e.g., elastic rubber roller or resin foam roller).

Since color mixture at the next procedure is generated by the toner attached to the intermediate transfer belt 61 by contacting with the photoreceptor drum 3 or by the toner that is not transferred onto the paper sheet by the transfer roller 10 and remained on the intermediate transfer belt 61, the toner is set to be removed and collected by the intermediate transfer belt cleaning unit 64. The intermediate transfer belt cleaning unit 64 includes, for example, a cleaning blade that is a cleaning member contacting with the intermediate transfer belt 61 and the intermediate transfer belt 61 contacting with the cleaning blade is supported by the intermediate transfer belt driven roller 63 from the back side. A waste toner that is no longer necessary is collected in a waste toner box 15.

The paper feeding cassettes 8 (8a, 8b, 8c and 8d) are trays for storing sheets (recording paper sheets) used for forming images and are provided on the under side of the exposure unit 1 of the image forming apparatus. The paper ejection tray 9 is provided on the upper side of the image forming apparatus and is a tray for accumulating the printed sheets face-down.

The image forming apparatus is provided with a paper conveying path S1 for sending the sheets in the paper feeding cassette 8 to the paper ejection tray 9 via the transfer roller 10 and the fixing unit 7. A pickup roller 11, a resist roller 12, the transfer roller 10, the fixing unit 7, etc. are disposed near the paper conveying path S1 from the paper feeding cassette 8 to the paper ejection tray 9.

The pickup roller 11 is provided near the end of the paper feeding cassette 8 and picks up the sheets one-by-one from the paper feeding cassette 8 to supply the sheets to the paper conveying path S1.

The resist roller 12 holds the sheet conveyed through the paper conveying path S temporarily. The resist roller 13 has a function for conveying the sheet to the transfer roller 10 at the timing when the leading end of the toner image on the photoreceptor drums 3 is matched with the leading end of the sheet.

The fixing unit 7 includes a heat roller 71 and a pressure roller 72, and the heat roller 71 and the pressure roller 72 hold the sheet and are rotated. The heat roller 71 is set to be a predetermined fixing temperature by a controlling portion based on a signal from a temperature detector not shown and performs the thermocompression of the toner to the sheet along with the pressure roller 72 to melt/mix/press the multicolor toner image transferred to the sheet to thermally fix the image to the sheet.

Detailed description will be made of the sheet conveying path. As described above, the image forming apparatus is provided with a plurality of the paper feeding cassettes 8 (8a, 8b, 8c and 8d) preliminary storing the sheets. To feed the sheets from the paper feeding cassette 8, the pickup roller 11 is disposed to guide the sheets to the sheet conveying path S1 one-by-one.

The sheet fed from the paper feeding cassette 8 is conveyed to the resist roller 12 and is conveyed to the transfer roller 10 at the timing of matching accurately the leading end of the sheet with the leading end of the image information on the intermediate transfer belt 61, and the image information is written onto the sheet. Subsequently, when the sheet passes through the fixing unit 7, the unfixed toner on the sheet is thermally melted and fixed, and the sheet is ejected on the paper ejection tray 9.

The above conveying path is used when one-side printing is requested for the sheet and, when two-side printing is requested, the sheet for which the one-side printing is executed and which has passed the fixing unit 7 is conveyed in the opposite direction and guided to a conveying path S2, and after the sheet passes through the resist roller 12 and the back side of the sheet is printed, the sheet is ejected on the paper ejection tray 9.

Specific description will be made of the embodiment of a laser scanning optical system of the optical scanning unit included in the above image forming apparatus. The optical scanning unit having the laser scanning optical system of the embodiment can be applied to the tandem-scheme image forming apparatus that forms a color image by simultaneously scanning and exposing each of the photoreceptor drums 3 with a plurality of light beams to form images with different colors on the respective photoreceptor drums 3 and by overlapping the images of respective colors on the same transfer medium.

In the embodiment, a laser diode 101 for scanning and exposing at least one photoreceptor drum utilizes a laser diode having a plurality of emitting points for simultaneously applying a plurality of laser beams (multi-beam) and scanning the photoreceptor drum(s).

As described above, the image forming apparatus is provided with the photoreceptor drum for forming a black (K) image, the photoreceptor drum for forming a cyan (C) image, the photoreceptor drum for forming a magenta (M) image, and the photoreceptor drum for forming a yellow (Y) image at substantially even intervals. Since the images of respective colors are formed simultaneously, the tandem-scheme image forming apparatus can reduce the time for forming a color image considerably. Since the photoreceptor drum for forming a black (K) image has the diameter twice as large as that of the photoreceptor drum for forming an image of another color, the image forming speed for forming monochrome images that are frequently printed can be improved.

In the following description, K, C, M, and Y stand for black, cyan, magenta, and yellow, respectively.

The optical scanning unit according to the present invention for exposing the photoreceptor drums 3 is constituted by a primary optical system (incoming optical system) and a secondary optical system (outgoing optical system) each of which is unitized. The primary optical system includes four semiconductor lasers emitting light beams for Y, M, C, and K, respectively, and optical elements such as mirrors and lenses guiding these light beams to a polygon mirror 201 (rotational polygon mirror) of the secondary optical system. The secondary optical system includes the polygon mirror 201 that scans the laser beams on the photoreceptor drums 3, i.e., scanned objects, optical elements such as mirrors and lenses guiding the light beams reflected by the polygon mirror 201 to the photoreceptor drums 3, and a BD sensor that detects the light beams, etc. The polygon mirror 201 is configured to be shared by each color.

Description will be made of the state of the light beam of each color among the optical elements in the aforementioned embodiment. FIGS. 2A and 2B are explanatory views of the state of the individual light beam of each color in the primary optical system and the secondary optical system; FIG. 2A shows a shape of one light beam in the main scanning direction schematically; and FIG. 2B shows a shape of one light beam in the sub-scanning direction schematically.

Description will be made of the behavior of the light beam in the main scanning direction shown in FIG. 2A. Each of a plurality of the light beam emitted from the laser diode 101 of the primary optical system is the diffused light and is made incident on the collimator lens 102. In the main scanning direction, the angle of the diffused light from the laser diode 101 is, for example, about 30 degrees.

The collimator lens 102 converts the incident diffused light to the parallel light, which is emitted. The aperture 103 is provided after the collimator lens 102, and the diameter of the light beam is regulated by the opening of the aperture 103. The opening diameter of the aperture 103 in the main scanning direction is about 7 mm in this case.

The light beam of the parallel light emitted from the aperture 103 is made incident on the cylindrical lens 112 of the primary optical system after its optical path is adjusted by mirrors not shown, etc. Since the cylindrical lens 112 of the primary optical system does not have a lens power in the main scanning direction, the incident parallel light passes through without change.

The light beam of the parallel light emitted from the cylindrical lens 112 passes through a mirror not shown, etc., and is made incident on the reflection face of the polygon mirror 201. As shown in the figure, the reflection face of the polygon mirror 201 changes its angle in the main scanning direction along with the rotation of the polygon mirror 201.

The light beam of the parallel light reflected by the polygon mirror 201 moves in the main scanning direction at a constant angular speed, is made incident on the first fθ lens 202, and is then made incident on the second fθ lens 203. The first fθ lens 202 and the second fθ lens 203 have a lens power in the main scanning direction and convert the parallel incident light beam to the convergent light converging on the surface of the photoreceptor drum 3. The light beam moving in the main scanning direction at a constant angular speed is converted such that the light beam moves on the scanning line of the surface of the photoreceptor drum 3 at a constant linear speed.

The second fθ lens 203 is a lens that complements the first fθ lens 202 and corrects the light beam emitted from the first fθ lens 202 such that the light beam behaves as intended.

The optical path between the second fθ lens 203 and the photoreceptor drum 3 is provided with the mirror(s) (one or a plurality of mirrors for each color) (not shown in FIG. 2A) for folding the optical path of each color and guiding it to the target photoreceptor drum 3 and the cylindrical lens 220 of the secondary optical system. Since the cylindrical lens 220 does not have a lens power in the main scanning direction, the light beam emitted from the second fθ lens 203 is not affected in the main scanning direction and travels to the photoreceptor drum 3. On the photoreceptor drum 3, the spot diameter of the light beam in the main scanning direction is, for example, about 60 μm.

Description will be made of the behavior of one light beam in the sub-scanning direction shown in FIG. 2B. Each of a plurality of the light beam emitted from the laser diode 101 is the diffused light and is made incident on the collimator lens 102, as is the case with the main scanning direction. However, in the sub-scanning direction, the angle of the diffused light from the laser diode 101 is, for example, about 11 degrees, which is smaller than that in the main scanning direction.

The collimator lens 102 converts the incident diffused light to the parallel light, which is emitted. The aperture 103 is provided after the collimator lens 102, and the diameter of the light beam is regulated by the opening of the aperture 103. The opening diameter of the aperture 103 is about 2 mm in this case.

The light beam of the parallel light emitted from the aperture 103 passes through a mirror not shown, etc., and is made incident on the cylindrical lens 112 of the primary optical system. Since the cylindrical lens 112 of the primary optical system has a lens power in the sub-scanning direction, the incident parallel light is converted to the convergent light that approximately converges on the reflection face of the polygon mirror 201. The light beam of the parallel light emitted from the cylindrical lens 112 passes through a mirror not shown and is made incident on the reflection face of the polygon mirror 201. In the sub-scanning direction, the light beam converges at approximately the center of the reflection face in the height direction. The optical face tangle error of the reflection face is corrected by generating a conjugated relation between the reflection face of the polygon mirror 201 and the surface of the photoreceptor drum 3.

The light beam reflected by the polygon mirror 201 is the diffused light, is made incident on the first fθ lens 202, and is then made incident on the second fθ lens 203. Since the first fθ lens 202 does not have a lens power in the sub-scanning direction, the light beam of the diffused light made incident on the first fθ lens 202 passes through without change.

The second fθ lens 203 has a lens power in the sub-scanning direction and converts the incident diffused light beam to the parallel light in the sub-scanning direction.

The optical path between the second fθ lens 203 and the photoreceptor drum 3 is provided with the mirror(s) (one or a plurality of mirrors for each color) (not shown in FIG. 2B) for folding the optical path of each color and guiding it to the target photoreceptor drum 3 and the cylindrical lens 220 of the secondary optical system. The cylindrical lens 220 has a lens power in the sub-scanning direction, and the light beam of the parallel light emitted from the second fθ lens 203 is converted to the light approximately converging on the surface of the photoreceptor drum 3. On the photoreceptor drum 3, the spot diameter of the light beam in the sub-scanning direction is about 67 μm.

Figure 3:
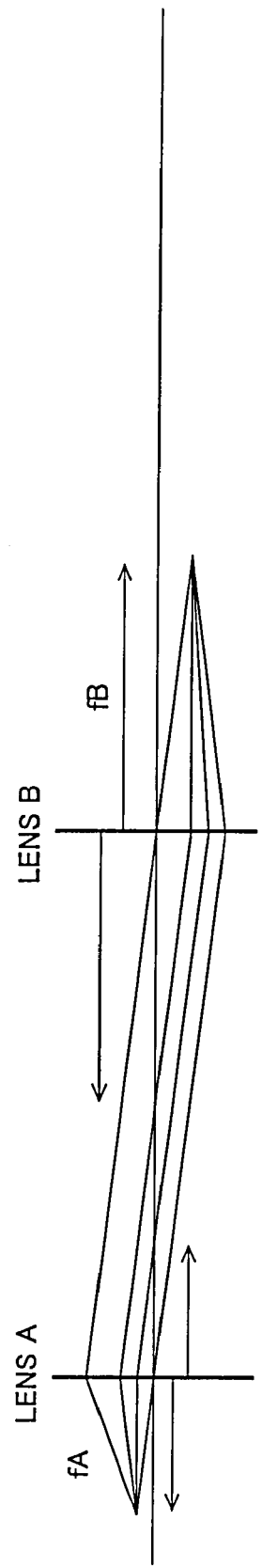
FIG. 3 is an explanatory view of an optical system configured by two lenses.

Description will be given for the converting device that converts a beam profile that is a feature of the laser scanning optical system of the present invention. Description will be given for an optical system configured by two lenses referring to FIG. 3 as a preparatory stage of the description of the specific exemplary configuration of the converting device. As shown in FIG. 3, light that exits the front focal plane of a lens A passes through the lens A and, thereafter, becomes parallel light. When the parallel light enters a lens B, the light forms an image on the rear focal plane of the lens B without depending on the incidence angle thereof into the lens B.

Assuming that the focal lengths of the above two lenses A and B are respectively fA and fB, the magnification N of the optical system configured by the above two lenses A and B is the ratio of the focal lengths of the two lenses A and B, that is, N=fB/fA.

Therefore, in an optical system configured by a plurality of lenses, when the magnification thereof is N, if the focal length fA of a first lens A becomes fA', the magnification of the optical system N' becomes N(fA/fA').

In an optical system having the front focal position of the lens A and the rear focal position of the lens B that is a back focus lens, that are in an optically conjugated relation, when a laser diode (LD) is provided at the front focal position of the lens A, an image is formed at the rear focal position of the lens B and the lateral magnification in this case is the ratio of the focal lengths of the lens A and the lens B without depending on the optical system between the lens A and the lens B.

In the example of the configuration of the laser scanning optical system of the above embodiment, the lens A is a collimator lens 102, an LD 101 is provided at the front focal position of the collimator lens 102, an aperture 103 for beam shaping is provided on the exit side of the lens A. After the aperture 103, a cylindrical lens (CY lens) 112 having power only in the sub-scanning direction is provided such that a focus is formed only in the sub-scanning direction on the surface of a polygon mirror 201.

The beam that is reflected being scanned from the polygon mirror 201 is converted by a scanning lens or a scanning mirror (in the above example, fθ lenses 202 and 203) from uniform angular velocity scanning thereof into uniform velocity scanning and forms a focus on the photoreceptor (the photoreceptor drum 3) in the main scanning direction. As to the sub-scanning direction, a toroidal surface of the scanning lens or the scanning mirror enables the beam to form a focus on the surface of the photoreceptor.

As to the sub-scanning direction, a lens or a mirror having power mainly in the sub-scanning direction may be added, and the power of the toroidal surface of the scanning lens or the mirror and the added optical device may divide functions. In the above example, the fθ lenses 202 and 203 and the cylindrical lens 220 form the focus on the surface of the photoreceptor (the photoreceptor drum 3).

In the above optical system, the position of the LD 101 and an exposed position on the surface of the photoreceptor are optically conjugated in the main scanning direction and the position of the LD 101, a substantial position of reflection of the polygon mirror 201, and an exposed position on the surface of the photoreceptor are optically conjugated in the sub-scanning direction. As to the sub-scanning direction, the optical face tangle error of the polygon mirror 201 is corrected by setting the above three points optically conjugated.

A beam spot diameter on the photoreceptor is determined by the oscillation frequency of the LD 101, a convergence angle, and wave front aberration. When the optical devices used in the optical system are ideal, the beam spot size becomes larger as the convergence angle becomes smaller due to the diffraction phenomenon of the laser.

Therefore, to reduce the beam spot size to execute high image quality printing, the back focus length needs to be shortened or the exit-side beam diameter of a back focus lens needs to be increased.

Figure 4:
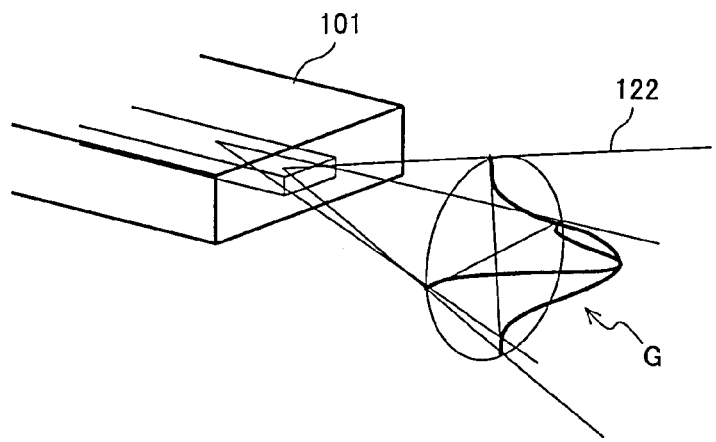
FIG. 4 is an explanatory view of a cross-sectional profile of a laser beam of an edge emitting laser diode.

FIG. 4 is an explanatory view of a cross-sectional profile of the laser light beam of the edge emitting LD 101. In FIG. 4, "122" denotes a laser beam emitted from the LD 101. The laser beam 122 emitted from the edge emitting LD 101 is emitted in an elliptic corn shape having a cross-sectional profile of a substantial Gaussian distribution G.

Figure 11:
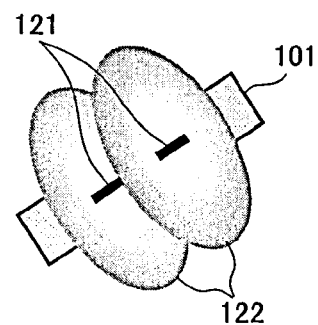
FIG. 11 diagrammatically depicts the emission profile of a laser light beam emitted from an edge emitting laser diode having two emission points.
Figure 12:
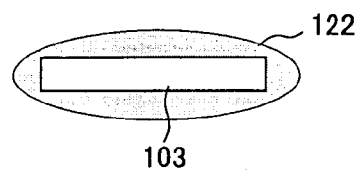
FIG. 12 diagrammatically depicts the relation between an aperture and an emission profile.
Figure 13:
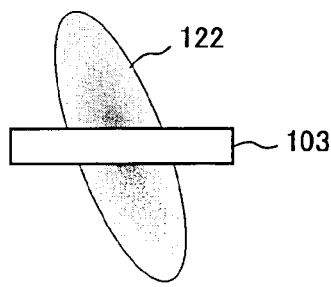
FIG. 13 diagrammatically depicts the relation between one laser light beam and an aperture obtained when the laser diode is rotated.

Representing the direction of the flow of a current in the LD chip (in an LD having multiple emitting points, a direction perpendicular to the lining of the emitting points) as "⊥" and a direction perpendicular to ⊥ (in an LD having multiple emitting points, a direction parallel to the lining of the emitting points) as "∥", for divergence angles α∥ and α⊥ of light exiting the LD, it gets α∥<α⊥. Therefore, the profile of the laser beam relative to the emitting point is as shown in the above FIG. 11. When this optical system is applied to the above optical scanning unit, α⊥ is the main scanning direction and α∥ is the sub-scanning direction.

In this case, the following equation approximately expresses the profile in a cross section of the laser light from the LD 101.

$$A \times \text{Exp}\left(-\left(2 \times \frac{x}{m\perp}\right)^2 - \left(2 \times \frac{y}{m\|}\right)^2\right) \quad \text{[Equation 6]}$$

where m⊥ is the diameter in the long axis direction of the elliptic light beam and m∥ is the diameter in the short axis direction of the elliptic light beam.

The following equation gives the beam profile in the aperture 103 obtained when the beam is converted by the collimator lens 102 into substantial parallel light.

$$A \times \text{Exp}\left(-\left(2 \times \frac{x}{m\perp}\right)^2 - \left(2 \times \frac{y}{m\|}\right)^2\right) \quad \text{[Equation 7]}$$

$$m\perp = 2 \times fA \times \tan\left(\frac{\alpha\perp}{2}\right) \quad \text{[Equation 8]}$$

$$m\| = 2 \times fA \times \tan\left(\frac{\alpha\|}{2}\right) \quad \text{[Equation 9]}$$

where α⊥ is a divergence angle in the direction of the flow of a current in the LD chip and α∥ is a divergence angle in the direction perpendicular to α⊥.

In this case, when the beam diameter of the laser beam is larger than the aperture 103, the beam is shaped by the aperture 103 and a desired spot size determined by the aperture 103 and the optical systems thereafter can be obtained on the surface of the photoreceptor. When the beam diameter is smaller than the aperture 103, the spot diameter on the photoreceptor is varied due to dispersion of divergence angle of the exiting beam from the LD 101, variation of the power of the LD 101, etc.

The light amount passing through the aperture 103 becomes small because the eclipse becomes larger as the beam diameter at the position of the aperture becomes larger.

Therefore, to use efficiently the power of the LD 101, it is preferable that the size of the beam at the position of the aperture 103 is substantially same as the size of the aperture 103.

That is, to use most efficiently the power of the LD 101, it is preferable that the long axis direction of the aperture 103 is matched with the divergence angle α⊥ of the exiting beam from the LD 101.

The following equation approximately gives the light amount passing through the aperture 103 in this case.

$$\int_{-Am}^{Am}\int_{-As}^{As} A \times \text{Exp}\left(-\left(2 \times \frac{x}{m\perp}\right)^2 - \left(2 \times \frac{y}{m\|}\right)^2\right) dx\,dy \quad \text{[Equation 10]}$$

where Am is the width of the aperture in the main scanning direction and As is the width of the aperture in the sub-scanning direction.

For the multi-emission LD 101 having a plurality of emitting points, it is not easy because the LD 101 is inclined against the main optical axis plane to match the simultaneous writing pitch on the photoreceptor.

In an optical system for which the above optical conjugation relation in the sub-scanning direction is established, the sub-scanning magnification is determined by the focal length fA of the collimator lens 102 and the focal length fB of the back focus lens.

Representing the pitch of the laser emitting points used as "β" and the pitch in the sub-scanning direction to execute simultaneous exposure on the photoreceptor as "L", the following equation holds using an inclination angle θ of the LD 101. "θ" is an angle formed by the lining direction of the emitting points of the LD 101 and the main scanning plane (the main optical axis plane).

$$L = \beta \times \frac{fB}{fA} \times \cos\theta \quad \text{[Equation 11]}$$

The beam at the position of the aperture 103 is inclined by inclining the LD 101. The following equation expresses the beam profile in this case.

$$A \times \text{Exp}\left(-\left(2 \times \frac{x \times \cos\theta + y \times \sin\theta}{m\perp}\right)^2 - \left(2 \times \frac{-x \times \sin\theta + y \times \cos\theta}{m\|}\right)^2\right) \quad \text{[Equation 12]}$$

The following equations give the beam widths at the position of the aperture 103 in this case.

$$\sqrt{\frac{1}{\left(\frac{\cos^2\theta'}{m\perp^2} + \frac{\sin^2\theta'}{m\|^2}\right)}} \quad \text{[Equation 13]}$$

$$\sqrt{\frac{1}{\left(\frac{\sin^2\theta'}{m\perp^2} + \frac{\cos^2\theta'}{m\|^2}\right)}} \quad \text{[Equation 14]}$$

As a result, it can be seen that the amount of the eclipse by the aperture 103 depends on not only the focal length of the collimator lens 102 but also the inclination angle θ of the LD 101.

For the divergence angle of the exiting beam from the LD 101, α∥<α⊥ as described above and, therefore, the beam width may become smaller than the aperture 103 when priority is put on the simultaneous degree scanning pitch on the photoreceptor.

A feature of the present invention is that the degree of freedom of designing is increased by introducing an optical device (hereinafter, "converting device") that converts the divergence angles α∥ and α⊥ of the exiting beam from the LD 101. The converting device has a function of converting an aspect ratio of the profile of the beam exited from the LD 101. This converting device may be a device formed by combining a plurality of cylindrical lenses respectively having different focal lengths or may be a lens having anamorphic surface on both sides thereof.

Figure 5A:
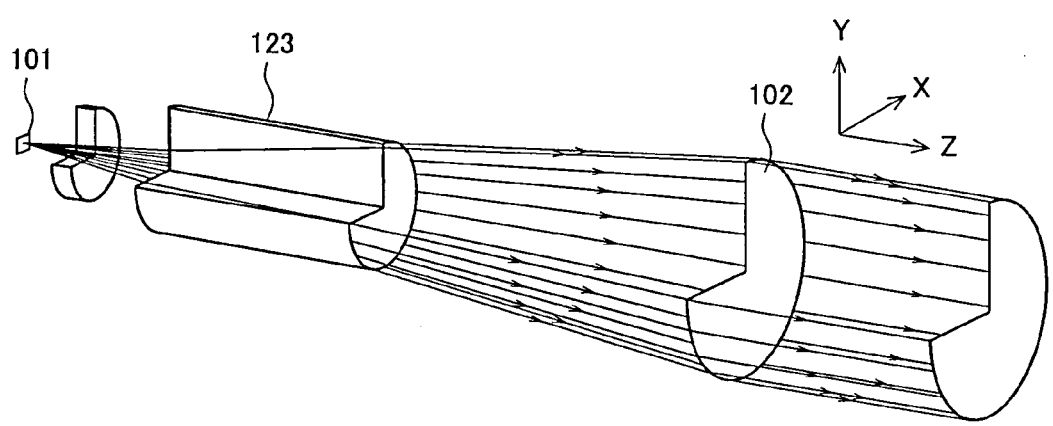
FIGS. 5A and 5B are explanatory views of a configuration example and functions of a converting device.
Figure 5B:
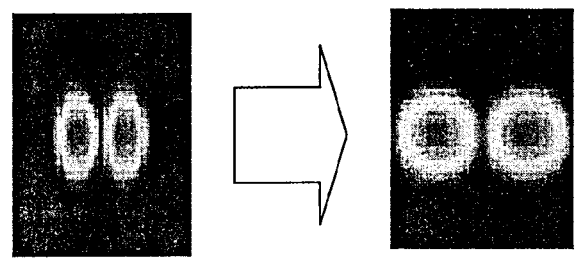

FIGS. 5A and 5B are explanatory views of a configuration example and functions of the converting device. In FIGS. 5A and 5B, "123" denotes the converting device (a beam shaper). As shown in FIG. 5A, in this example, a configuration is contemplated that includes the above converting device 123 introduced between the LD 101 and the collimator lens 102.

As shown in FIG. 5B, the converting device 123 enlarges the exiting beam of the LD 101 in a specific direction and does not enlarge the light beam in a direction perpendicular to the specific direction. For simplicity, even when the converting device 123 is introduced into the above optical system, the focal length of the collimator lens 102 has not changed.

For conversion by the converting device 123 of the divergence angles $\alpha\|$ and $\alpha\perp$ of the exiting beam of LD 101, conversion coefficients are represented respectively as $\Delta\|$ and $\Delta\perp$. It is assumed that the converting device 123 is rotated synchronized with the rotation of the LD 101 to match the simultaneous degree scanning pitch on the photoreceptor with a desired value.

By introducing the converting device 123, the laser emitting point pitch is effectively varied. The sub-scanning line pitch L on the photoreceptor can be expressed in the following equation.

$$L = \Delta\| \times \beta \times \frac{fB}{fA} \times \cos\theta' \qquad \text{[Equation 15]}$$

Therefore, the light beam diameter at the aperture 103 is given in the following equation for a rotation angle $\theta'$ of an LD that gives a desired simultaneous exposure pitch on the photoreceptor. In the equation, M$\perp$ is the beam width in the main scanning direction, M$\|$ is the beam width in the sub-scanning direction, and $\theta'$ is a rotation angle of the LD.

$$m\perp = 2 \times fA \times \tan\left(\Delta\perp \frac{\alpha\perp}{2}\right) \qquad \text{[Equation 16]}$$

$$m\| = 2 \times fA \times \tan\left(\Delta\| \frac{\alpha\|}{2}\right) \qquad \text{[Equation 17]}$$

$$M\perp = \sqrt{\frac{1}{\left(\frac{\cos^2\theta'}{m\perp^2} + \frac{\sin^2\theta'}{m\|^2}\right)}} \qquad \text{[Equation 18]}$$

$$M\| = \sqrt{\frac{1}{\left(\frac{\sin^2\theta'}{m\perp^2} + \frac{\cos^2\theta'}{m\|^2}\right)}} \qquad \text{[Equation 19]}$$

The light beam widths M$\perp$ and M$\|$ are adapted to be larger than at least the width of the aperture 103. That is, representing the width of the aperture 103 in the main scanning direction as Am and the width thereof in the sub-scanning direction as As, by setting conditions that satisfy the following equations (Equation 20 and Equation 21), the light beam width at the aperture 103 is larger than the aperture 103 and, therefore, the desired beam diameter can be obtained on the photoreceptor. Thereby, the power of the LD 101 can be efficiently utilized. In this case, the power of the LD 101 can be most efficiently utilized when the left side is equal to the right side in each of the following Equation 20 and Equation 21 under a condition that the light beam width at the position of the aperture 103 is equal to the width of the aperture 103.

$$Am < \sqrt{\frac{1}{\left(\frac{\cos^2\theta'}{m\perp^2} + \frac{\sin^2\theta'}{m\|^2}\right)}} \qquad \text{[Equation 20]}$$

$$As < \sqrt{\frac{1}{\left(\frac{\sin^2\theta'}{m\perp^2} + \frac{\cos^2\theta'}{m\|^2}\right)}} \qquad \text{[Equation 21]}$$

The above converting device may employ any one of a configuration that includes the device formed integrally with the collimator lens, a configuration that includes the device provided on the optical path between the LD 101 and the collimator lens 102, and a configuration that includes the device provided on the optical path between the collimator lens 102 and the aperture 103. As above, the converting device may be a device formed by combining a plurality of cylindrical lenses having respectively different focal lengths or may be a lens having anamorphic surfaces on both sides thereof. When the collimator lens and the converting device are integrally formed, the collimator lens is added with a functions of converting the aspect ratio of the diverging light beam and converting the light beam into parallel light by providing an anamorphic shape for the collimator lens.

To adjust the line pitch in the sub-scanning direction on the photoreceptor (the image carrier), these converting devices are adjusted such that the inclination angle of the devices are equal to the rotation angle of the LD 101. That is, when the LD 101 is rotated, the angle of the converting device is set to match the rotation angle $\theta$ of the LD 101 such that the conversion coefficients $\Delta\|$ and $\Delta\perp$ respectively coincide with the long axis direction and the short axis direction of the profile of the emitted beam.

In the above embodiment, an example is shown that uses a multi-emission LD having a plurality of emitting points formed integrally. However, a laser light source similar to the above multi-emission LD may be configured by using a plurality of single emission LDs each of which is a separated LD and adjusting light beams emitted respectively from these LDs and the optical paths by utilizing optical means such as a half mirror or a mirror.

Figure 6:
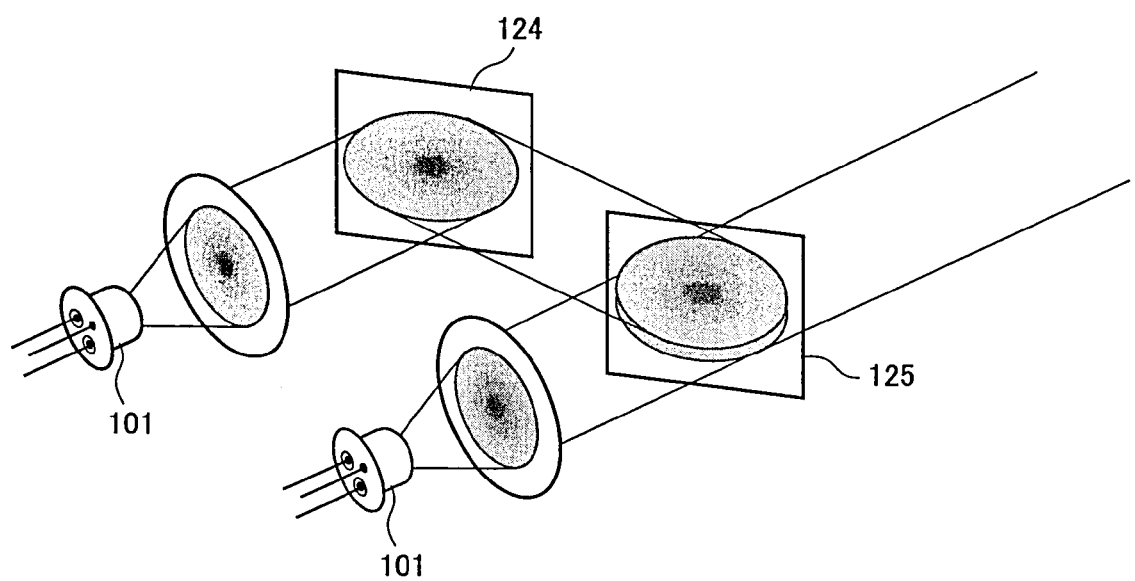
FIG. 6 is an explanatory schematic view of a configuration example of a laser light source using a plurality of laser diodes each having a single emitting point.

FIG. 6 is an explanatory schematic view of a configuration example of a laser light source using a plurality of laser diodes each having a single emitting point. As shown in FIG. 6, a laser light source can be configured that has a function similar to that of the above multi-emission LD by adjusting light beams of the plurality of LDs 101 and the optical paths using a mirror 124 and a half mirror 125.

Embodiment

FIG. 7 depicts an example of the simulation result in an optical system that is configured to use a multi-emission LD having two emitting points, convert a beam emitted from the LD using a collimator lens into parallel light, and shape this beam using an aperture.

In the embodiment, an optical system having a back focus of 76.9 mm is used and a multi-emission LD having the emitting point pitch of 14 µm is used. In the embodiment, the LD having the divergence angle $\alpha\|$ of 11.8° and the divergence angle $\alpha\perp$ of 35.3° is used.

The exposure pitch of the sub-scanning lines on the photoreceptor is 42.3 µm. This corresponds to the exposure pitch used when image forming is executed with 600 dpi that is currently a common pixel density (resolution). An aperture is used that has the aperture width Am in the main scanning direction of 3.59 mm and the aperture width As in the sub scanning direction of 1.21 mm.

The conversion coefficient A represents the conversion magnification of the converting device of the present invention. $\Delta\perp$ represents the conversion magnification of the converting device corresponding to the direction perpendicular to the lining of the emitting points and, herein, represents how many times as large as the divergence angle $\alpha\perp$ of 35.3° the conversion is executed into. $\Delta\|$ represents the conversion magnification of the converting device corresponding to the direction parallel to the lining of the emitting points and, herein, represents how many times as large as the divergence angle $\alpha\|$ of 11.8° the variation is executed into.

A table in FIG. 7 lists the result of calculation, based on a simulation, of the beam diameters m∥, m⊥, M∥, and M⊥ at the position of the aperture obtained when the conversion coefficients $\Delta\perp$ and $\Delta\|$ are both fixed at one and the focal length f of the collimator lens is varied in the optical system under the above conditions. In this case, the rotation angle θ varies corresponding to the variation of the focal length f of the collimator lens under the condition that the predetermined exposure pitch of 42.3 μm can be obtained.

The evaluation result in the table of FIG. 7 shows that, when the focal length of the collimator lens is equal to or larger than 14.61, the beam diameter at the position of the aperture is larger than the width of the aperture and, therefore, a desired beam diameter can be obtained on the photoreceptor.

FIG. 8 depicts a table that lists the calculation result of the focal length of the collimator lens necessary in the optical system for which the above simulation of FIG. 7 is executed. FIG. 8 shows the necessary focal length f of the collimator lens in the relation between the conversion coefficient $\Delta\perp$ in the main scanning direction and the conversion coefficient $\Delta\|$ in the sub-scanning direction.

Figure 9:
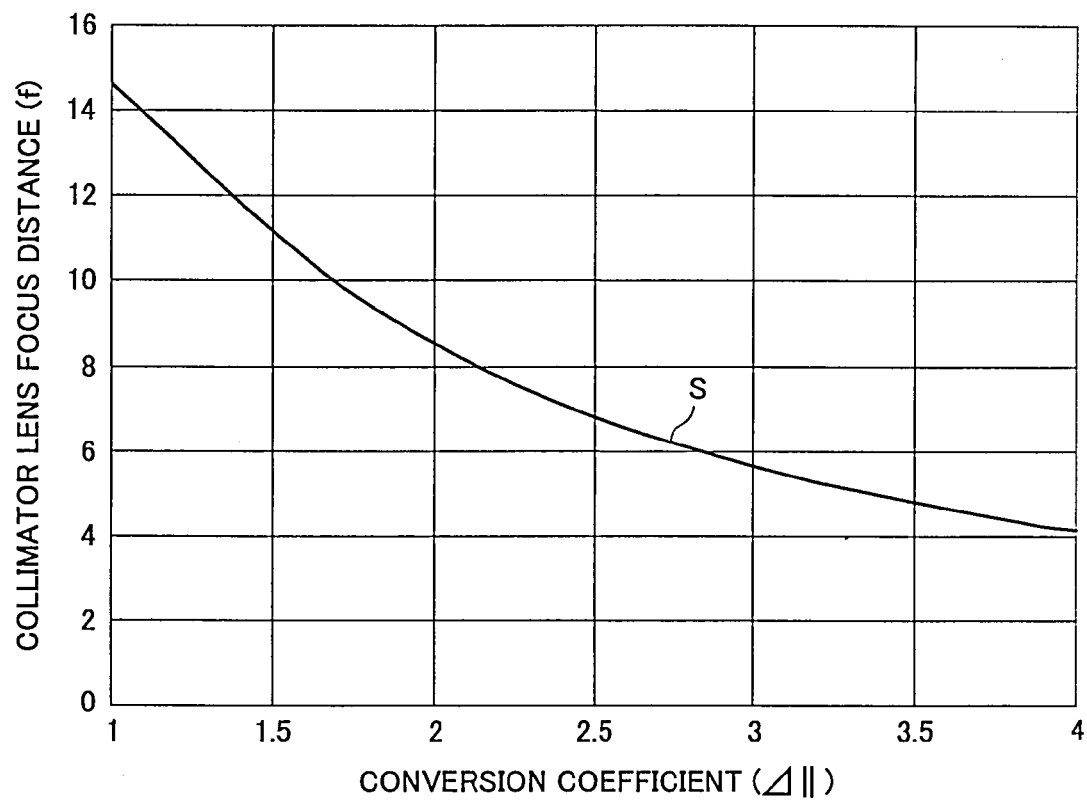
FIG. 9 graphically depicts the relation between a conversion coefficient $\Delta\|$ and the focal length of the collimator lens obtained when the conversion coefficient $\Delta\perp$ of FIG. 8 is fixed at one and a conversion coefficient $\Delta\|$ is varied.
Figure 10:
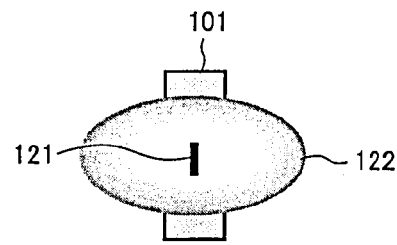
FIG. 10 diagrammatically depicts the emission profile of a laser light beam emitted from an edge emitting laser diode having one emission point.

FIG. 9 graphically depicts the relation between the conversion coefficient $\Delta\|$ and the focal length of the collimator lens obtained when the conversion coefficient $\Delta\perp$ of FIG. 8 is fixed at one and the conversion coefficient $\Delta\|$ is varied.

When the LD 101 is rotated against the main scanning plane, a direction ⊥ perpendicular to the disposition direction of the emitting points corresponds to the long axis direction of the elliptic profile and the profile does not need to be further enlarged in the direction ⊥. That is, as to the direction ⊥ perpendicular to the disposition direction of the emitting points, a beam spot formed by the rotation of the LD 101 depends a little on the conversion.

Therefore, the light beam profile is enlarged in the disposition direction ∥ of the emitting points using the converting device 123 shown in the above FIG. 5A. In this case, the converting device 123 is disposed being rotated such that the converting device 123 enlarges the beam in the disposition direction of the emitting points according to the rotation of the LD 101.

A curve S of FIG. 9 represents the border of the condition under which the beam diameter at the position of the aperture is larger than the width of the aperture in the above optical system and the desired light beam diameter can be obtained on the photoreceptor, and the above condition is satisfied in the region above the curve S.

The region above the curve S corresponds to the condition of corrective coefficients shown in the above Equation 20 and Equation 21.

In this case, it is preferable that a condition as close as possible to the curve S that represents the border is selected. For example, when the focal length f of the collimator lens is set under the condition in a region far from the curve S, the beam diameter is relatively large compared with the dimensions of the aperture. Therefore, the eclipse by the aperture is increased and the energy of the beam passing through the aperture is decreased. That is, a condition closer to the curve S is more preferable in terms of the light utilization efficiency.

The curve S of FIG. 9 is a calculated example under a specific condition in the specific optical system described referring to the above FIG. 7. Therefore, the curve S is varied according to conditions such as the emitting point pitch and the divergence angle of the LD, the aperture dimensions, and exposure pitch.

Basically, it is necessary to satisfy the relation of the above Equation 20 and Equation 21 and, when satisfied, it is preferable that a condition is selected that makes the left side and the right side of each of Equation 20 and Equation 21 as close as possible to each other.

According to the present invention, the following effects can be obtained.

According to the present invention, the energy transmission efficiency from a laser diode (LD) to a photoreceptor can be improved and the variation of power caused by the rotation of the LD can be suppressed. Thereby, there can be provided a laser scanning optical system having a high efficiency and high reliability laser scanning characteristic, and an image forming apparatus having the optical system.

The invention claimed is:

1. A laser scanning optical system having a semiconductor laser, a collimator lens that converts a plurality of light beams emitted from the semiconductor laser into parallel light, and an aperture that defines a diameter of a spot of the light beam on an image carrier, and the system scanning the light beams emitted from the collimator lens and exposing simultaneously a plurality of lines on the image carrier, wherein the laser scanning optical system has a converting device that converts an aspect ratio of a profile of the light beam exited from the semiconductor laser, wherein the converting device converts the plurality of light beams, and wherein when it is assumed that a main scanning direction is a beam scanning direction in the laser scanning optical system and a sub-scanning direction is a direction perpendicular to the main scanning direction, $$Am < \sqrt{\frac{1}{\left(\frac{\cos^2\theta'}{m\perp^2} + \frac{\sin^2\theta'}{m\|^2}\right)}} \quad \text{[Equation 1]}$$

$$As < \sqrt{\frac{1}{\left(\frac{\sin^2\theta'}{m\perp^2} + \frac{\cos^2\theta'}{m\|^2}\right)}} \quad \text{[Equation 2]}$$

$$L = \Delta\| \times \beta \times \frac{fB}{fA} \times \cos\theta' \quad \text{[Equation 3]}$$

$$m\perp = 2 \times fA \times \tan(\Delta\perp \frac{\alpha\perp}{2}), \text{ and} \quad \text{[Equation 4]}$$

$$m\| = 2 \times fA \times \tan(\Delta\|\frac{\alpha\|}{2}) \quad \text{[Equation 5]}$$

hold, where
Am is a width of the aperture in the main scanning direction;
As is a width of the aperture in the sub-scanning direction;
m⊥ is a diameter of an elliptic light beam in a long axis direction;
m∥ is a diameter of the elliptic light beam in a short axis direction;

fA is a focal length of the collimator lens;

fB is a focal length of a back focus lens;

$\alpha\perp$ is a divergence angle in a direction perpendicular to lining of semiconductor laser emitting points;

$\alpha\|$ is a divergence angle in a direction parallel to the lining of the semiconductor laser emitting points;

β is a disposition interval of the semiconductor laser emitting points;

θ' is a rotation angle formed by the lining direction of the semiconductor laser emitting points and a main scanning plane;

$\Delta\perp$ is a conversion coefficient of the converting device corresponding to the direction perpendicular to the lining of the semiconductor laser emitting points;

$\Delta\|$ is a conversion coefficient of the converting device corresponding to the direction parallel to the lining of the semiconductor laser emitting points; and L is a line pitch of an exposing light beam in the sub-scanning direction.

2. The laser scanning optical system of claim 1, wherein the collimator lens functions as the converting device by having an anamorphic shape, converts the aspect ratio of the profile of the light beam emitted from the semiconductor laser, and converts the light beam into parallel light.

3. The laser scanning optical system of claim 2, wherein the collimator lens is adjusted to be at an inclination angle equal to an inclination angle θ of the semiconductor laser to adjust the pitch in the sub-scanning direction on the image carrier.

4. An image forming apparatus comprising:

the laser scanning optical system of claim 3; and a photoreceptor, wherein the laser scanning optical system forms a latent image on the photoreceptor, the latent image is visualized, and, thereby, image forming is executed.

5. An image forming apparatus comprising:

the laser scanning optical system of claim 2; and a photoreceptor, wherein the laser scanning optical system forms a latent image on the photoreceptor, the latent image is visualized, and, thereby, image forming is executed.

6. The laser scanning optical system of claim 1, wherein the converting device is provided on an optical path between the collimator lens and the semiconductor laser.

7. The laser scanning optical system of claim 6, wherein the converting device is adjusted to be at an inclination angle equal to an inclination angle of the semiconductor laser to adjust the pitch in the sub-scanning direction on the image carrier.

8. An image forming apparatus comprising:

the laser scanning optical system of claim 7; and a photoreceptor, wherein the laser scanning optical system forms a latent image on the photoreceptor, the latent image is visualized, and, thereby, image forming is executed.

9. An image forming apparatus comprising:

the laser scanning optical system of claim 6; and a photoreceptor, wherein the laser scanning optical system forms a latent image on the photoreceptor, the latent image is visualized, and, thereby, image forming is executed.

10. The laser scanning optical system of claim 1, wherein the converting device is provided on an optical path between the collimator lens and the aperture.

11. The laser scanning optical system of claim 10, wherein the converting device is adjusted to be at an inclination angle equal to an inclination angle of the semiconductor laser to adjust the pitch in the sub-scanning direction on the image carrier.

12. An image forming apparatus comprising:

the laser scanning optical system of claim 11; and a photoreceptor, wherein the laser scanning optical system forms a latent image on the photoreceptor, the latent image is visualized, and, thereby, image forming is executed.

13. An image forming apparatus comprising:

the laser scanning optical system of claim 10; and a photoreceptor, wherein the laser scanning optical system forms a latent image on the photoreceptor, the latent image is visualized, and, thereby, image forming is executed.

14. The laser scanning optical system of claim 1, wherein the plurality of light beams are emitted light beams by one semiconductor laser having a plurality of emitting points or by a plurality of semiconductor lasers each having one emitting point.

15. An image forming apparatus comprising:

the laser scanning optical system of claim 14; and a photoreceptor, wherein the laser scanning optical system forms a latent image on the photoreceptor, the latent image is visualized, and, thereby, image forming is executed.

16. An image forming apparatus comprising:

the laser scanning optical system of claim 1; and a photoreceptor, wherein the laser scanning optical system forms a latent image on the photoreceptor, the latent image is visualized, and, thereby, image forming is executed.

\* \* \* \* \*